United States Patent [19]

Pocobello

[11] 3,957,283
[45] May 18, 1976

[54] ONE-WAY SPRING LOADED CONNECTOR FOR SINGLE RETRACTOR CONTINUOUS LOOP RESTRAINT SYSTEM

[75] Inventor: Michael A. Pocobello, Warren, Mich.

[73] Assignee: American Safety Equipment Corporation, Encino, Calif.

[22] Filed: Feb. 12, 1975

[21] Appl. No.: 549,362

[52] U.S. Cl. .................... 280/747; 242/107.4 R; 297/385
[51] Int. Cl.² ............................................. B60R 21/00
[58] Field of Search ............ 280/150 SB; 180/82 C; 297/385; 242/107.4 R

[56] References Cited
UNITED STATES PATENTS

| | | | |
|---|---|---|---|
| 3,341,250 | 9/1967 | Rasmussen | 242/107.4 R X |
| 3,351,382 | 11/1967 | Davies | 280/150 SB X |
| 3,888,541 | 6/1975 | Stephenson | 280/150 SB X |

*Primary Examiner*—M. H. Wood, Jr.
*Assistant Examiner*—Michael J. Forman
*Attorney, Agent, or Firm*—Poms, Smith, Lande & Glenny

[57] ABSTRACT

In a continuous loop restraint system wherein one end of a length of webbing is anchored near the vehicle seat and the other end of the webbing is anchored near the roof of the automobile, a releasable anchor for releasably anchoring a central portion of the webbing is provided so that the portion of the webbing from the floor anchor to the releasable anchor becomes a lap belt and the portion from the roof mounted anchor to the releasable anchor becomes a shoulder belt. A retractor is provided for winding one end of the webbing therearound. The webbing can slide relative to the releasable anchor to allow respective webbing sections to be of desired lengths. The restraint system has been improved by providing drive means associated with the releasable anchor for urging the webbing through the releasable anchor toward the retractor so that excess webbing is wound about the retractor and so that the portion of the webbing between the stationary anchor and the releasable anchor is tight. The drive means may comprise spring loaded means wound to a tensioned condition when the releasable anchor is moved from a stowed position to its anchored position for urging the webbing toward the retractor. Teeth are provided on the webbing, a gear is provided on the drive means, and the gear engages the teeth to insure positive drive between the webbing and the drive means. The teeth may be located on a strip attached to one side of the webbing, and a stop may be associated with the strip for limiting the length of webbing which can pass through the releasable anchor.

9 Claims, 5 Drawing Figures

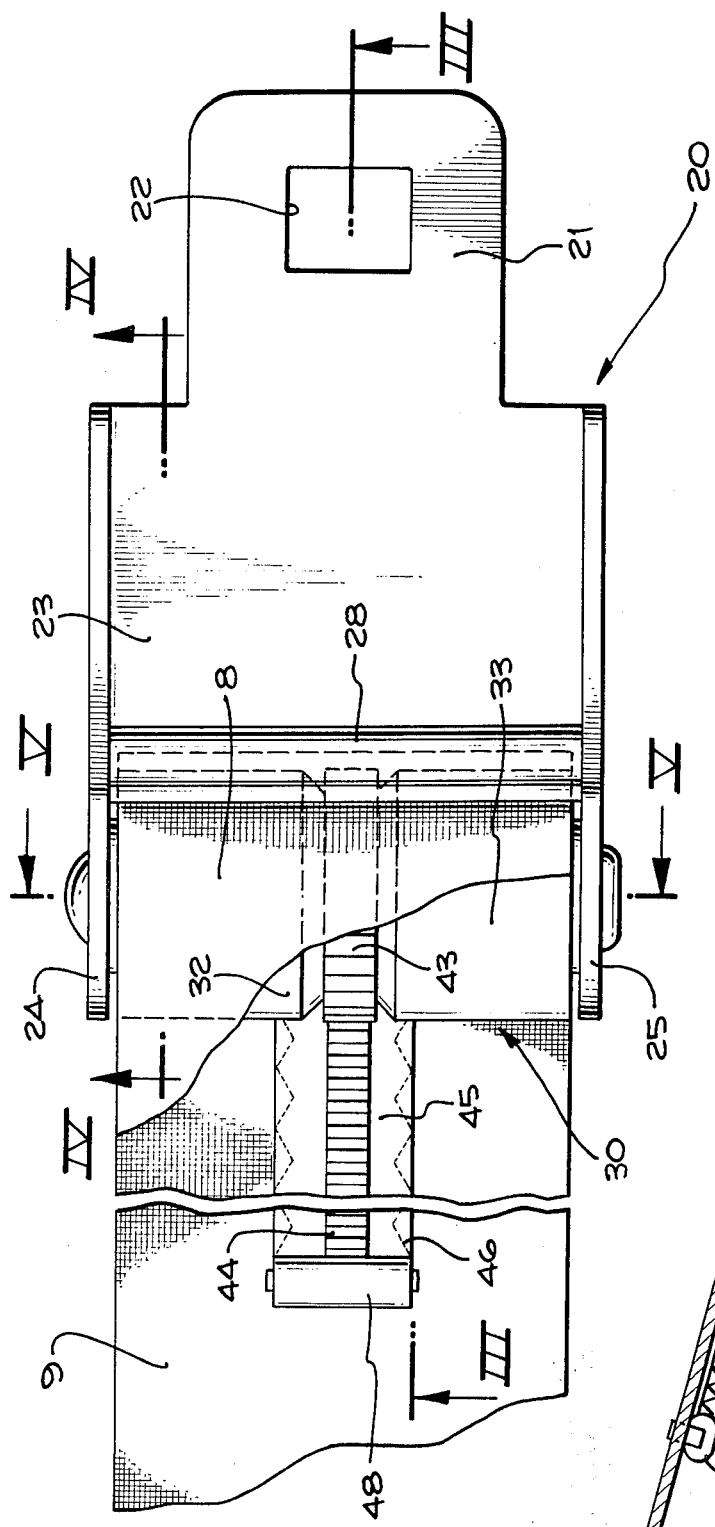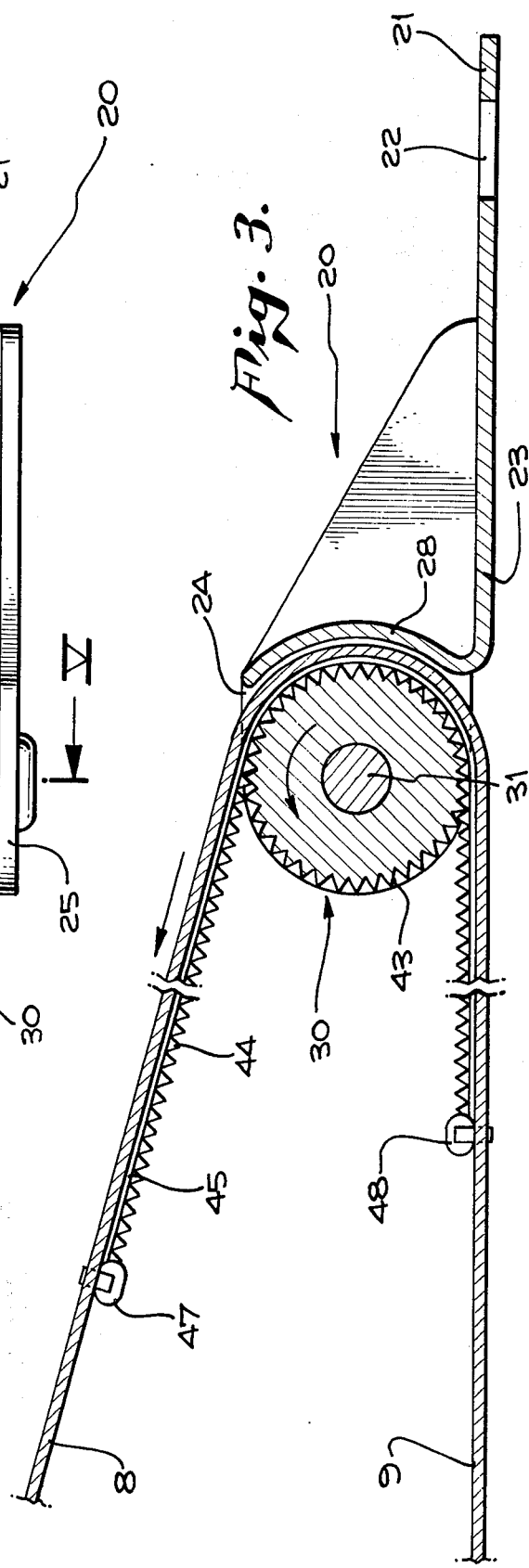

ONE-WAY SPRING LOADED CONNECTOR FOR SINGLE RETRACTOR CONTINUOUS LOOP RESTRAINT SYSTEM

BACKGROUND OF THE INVENTION

Continuous loop restraint systems for restraining a person in a vehicle seat are known in the art and such systems are gaining popularity. In such a system, one end of the belt is attached to the floor and the other end is attached to the ceiling or door post of the vehicle. The webbing passes through a connector or releasable anchor adapted to be attached to the floor on the side of the user opposite the permanent floor anchor. Either end could be attached to a retractor, but for reasons set forth below, it is advantageous that the retractor be mounted in the ceiling or the door post position rather than on the floor.

When the vehicle is unoccupied, the webbing is fully retracted on the retractor and the remaining webbing runs directly from the floor anchor through the connector to the retractor assuming the retractor is in the preferred door post or ceiling position. When the restraint system is to be used, the occupant of the vehicle pulls on the connector to withdraw webbing from the retractor. Sufficient webbing passes through the connector so that there is enough webbing to cross the occupant's lap, and the connector or releasable anchor is anchored to a releasable buckle on the other side of the seat from the anchored end of the webbing.

A continuous loop system allows the use of a single retractor. By using a continuous loop system the three point tongue plate is unnecessary, and the extra cost of cutting and sewing the belt at the tongue plate can also be eliminated. The main drawback, however, with such a system is the tendency for the lap belt portion to be loose around the pelvis. In order for the lap belt portion to effectively restrain the lower part of the user, it must fit tightly around the pelvis so that the large bones in the hip absorb the crash forces transmitted by the belt. If it is loose and rides up into the abdominal portion where there is minimal skeletal protection, the belt can injure internal organs during a crash.

Generally, the retractors used in present safety belt systems are not strong enough to pull the lap belt portion of the webbing through the connector and up into the shoulder portion. Even if such a retractor were used, the resultant pull on the shoulder portion of the webbing would be too strong and the user would be constantly forced back into his seat. It is not important that the shoulder strap be tight around the occupant's chest, and it should be loose enough to permit him to lean forward and reach all the vehicle controls. Moreover, for the user's comfort, clips and tensionless retractors, the latter being taught by U.S. Pat. No. 3,550,875 which exerts no force in normal operation to the shoulder strap, are now provided in many vehicles to prevent the shoulder strap from pulling against the user.

It has also been proposed to provide a one-way fitting on the connector in order to prevent the webbing from moving through the connector and loosening the lap belt portion. Such systems are proposed in the patent to Sharp U.S. Pat. No. 3,258,293 and Carter U.S. Pat. No. 3,606,455. In many prior systems, the lap belt must be manually tightened by pulling the shoulder strap through the one-way connector or the connector must be manipulated so that the retractor will tighten the belts. If the strap is not pulled tight enough, injury can result. Another major drawback is that when the seat location or size of passenger is modified, the lap belt portion may have to be lengthened. With one-way connectors, it may be time consuming and somewhat difficult to pull the lap belt portion the wrong way through the one-way connector.

Therefore, it is an object of the invention to provide a continuous loop restraint system which will automatically provide a tight lap belt even when used with a variety of retractors. A further object of the invention is to provide such an automatic system which can be adapted for different sized occupants and different seat locations of the vehicle without any manual adjustments to the system. A further object is to provide a system which can be completely retracted on the vehicle retractor to remain flush against the side of the vehicle and yet can be automatically deployed without any manual adjustments to maintain a tight lap belt. These and other objects are explained in the foregoing description.

SUMMARY OF THE INVENTION

The connector or releasable anchor of a continuous loop restraint system has been improved by including drive means on the connector for driving the webbing through the connector to tighten the webbing on the side of the connector from which the webbing is pulled. Spring means are associated with the drive means for driving the drive means. The spring is wound when the connector is pulled from the stowed position to its position attached to the buckle so that when the connector is attached to the buckle the spring means releases its stored energy by unwinding the spring means. This causes the drive means to drive the belt through the connector. Teeth are provided on the webbing and gear means are provided on the drive means. The gear means engage the teeth to insure positive drive between the webbing and the drive means.

BRIEF DESCRIPTION OF THE DRAWINGS

FIG. 2 is a top view of the spring loaded connector of the present invention and shows its relationship to the webbing of the harness.

FIG. 3 is a sectional view taken through the plane III—III of FIG. 2.

DETAILED DESCRIPTION OF THE PREFERRED EMBODIMENT

Figure 1:
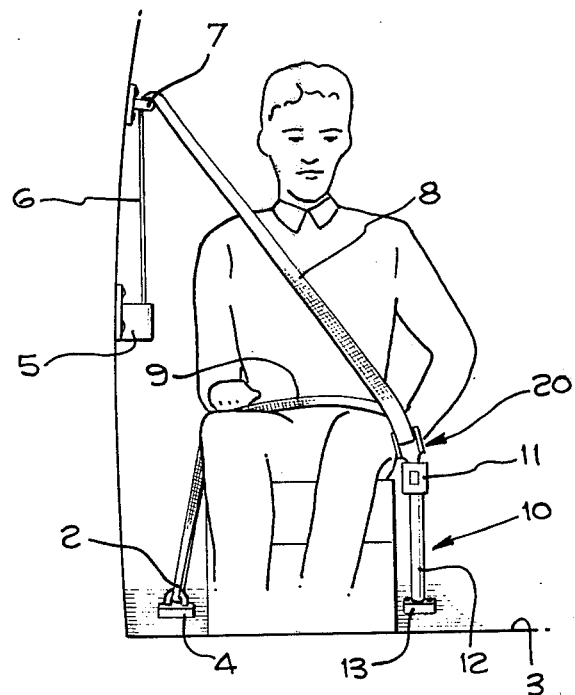
FIG. 1 is a perspective view showing a single retractor continuous loop restraint system which incorporates the one-way spring loaded connector, the invention herein.

A continuous loop restraint system is shown in the exemplary embodiment in FIG. 1. One end 2 of the webbing is fixed to the vehicle floor 3 at an anchor 4. The other end of the webbing is anchored near the roof of the automobile. A retractor is provided for winding one end of the webbing therearound. In the exemplary embodiment, the retractor is mounted near the roof of the automobile. Referring to FIG. 1, retractor 5 has the other end of the webbing 6 connected thereto. From the retractor 5, the webbing is looped over a fitting 7 and extends downward across the person's chest as a shoulder harness porton 8. The floor portion of the webbing 2 extends upward and crosses the user's lap and is indicated as lap belt portion 9. The continuous loop of which lap belt 9 and shoulder harness section 8 are a part is looped through the connector or releasable anchor 20. The connector 20 is releasably mounted to a releasing anchor 10 which includes a buckle 11 which is attached to a rigid mounting post 12 for positioning the buckle, and the post 12 is anchored to the vehicle floor 3 by anchor 13. The anchors and the post are positioned in order to ensure correct positioning of the lap belt 9 about the user's pelvis.

The basic harness system shown in FIG. 1 could be modified in a number of ways. For example, shoulder belt 8 could run directly to a retractor mounted on the roof of the vehicle rather than passing through a fitting 7 and then down to a post mounted retractor. The retractor could also be mounted at the permanent floor anchor and the roof anchor be made nonretracting and permanent. The type of retractor could be modified and the anchors 3 and 13 on the buckle 11 could also be modified. Moreover, other modifications could be made in the overall harness by one of ordinary skill in the art. However, for reasons stated above, the discussion will be confined to a system wherein the shoulder belt is connected to the anchor and the lap belt is permanently anchored to the vehicle floor.

In order for the harness to be most effective, the lap belt should fit tightly about the user's pelvis and resting on his thighs. If the lap belt portion is loose during a crash, the belt may engage the unprotected abdomen of the user and crush internal organs which are not protected by the skeleton. The user may also submarine below the loose lap belt so that his lower torso is completely unrestrained. Therefore, it becomes imperative that any slack in the lap belt portion be taken up into the shoulder harness portion.

The connector of the present invention has been improved by providing drive means on the connector for driving the webbing through the connector to tighten the webbing on the side of the connector from which the webbing is pulled. In the exemplary embodiment, the details of the improved connector are shown more clearly in FIGS. 2 through 5. The connector or releasable anchor 20 includes a tongue plate portion 21 with aperture 22 therein which is engaged by the buckle 11 in a conventional manner. The tongue plate portion is formed as a part of the main frame 23 of the connector.

The drive means that drives the webbing through the connector is shown generally at 30 in the exemplary embodiment. The drive means urges the webbing to lengthen the shoulder harness portion 8 and tighten the lap belt portion 9. The urging is in the direction of the arrows in FIGS. 3 and 4.

Figure 4:
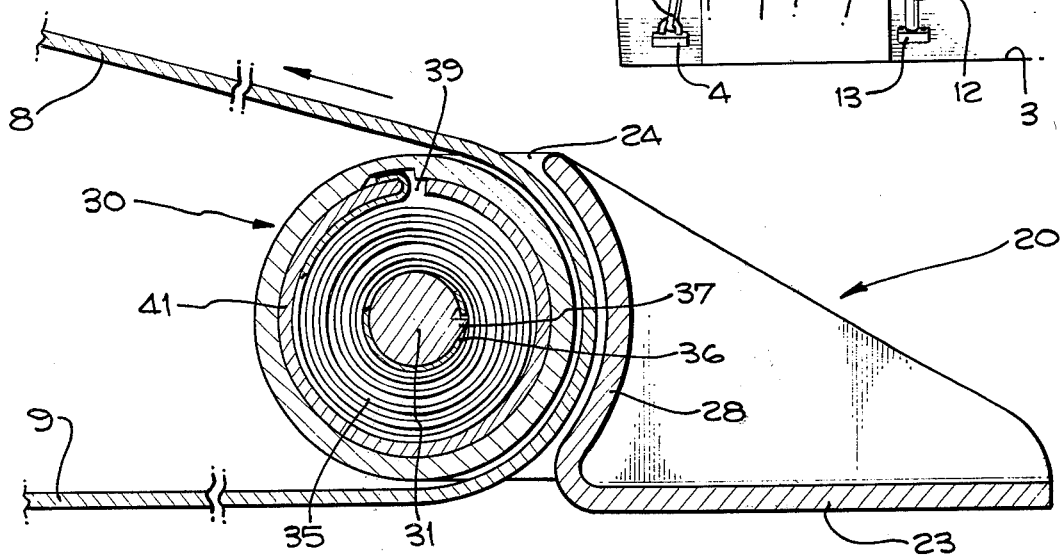
FIG. 4 is a sectional view taken along the plane IV—IV in FIG. 2.
Figure 5:
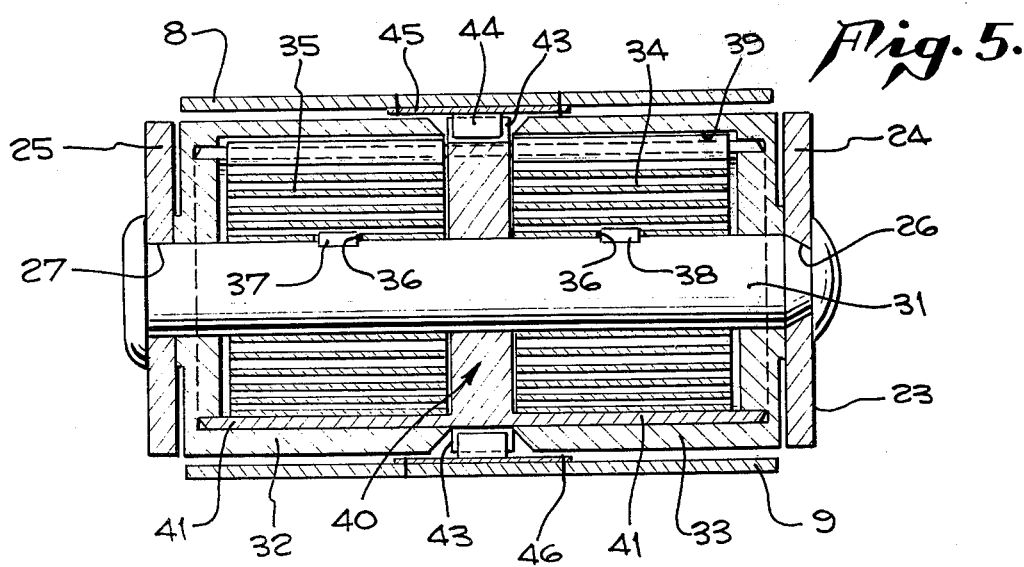
FIG. 5 is also a sectional view and is taken along the plane V—V in FIG. 2.

Spring loaded means wound to a tension condition when the releasable anchor or connector is moved from a stowed position to its anchored position urges the webbing toward the retractor. When the connector is attached to the buckle, the spring means releases its stored energy by unwinding so that the drive means drives the belt. The spring means is shown in more detail in the exemplary embodiment in FIGS. 4 and 5. Shaft 31 is mounted in aligned apertures 26 and 27 in the side walls 24 and 25 of main frame 23. Bushings 32 and 33 rotate with respect to the shaft 31, and mounted within the bushings are springs 34 and 35. The inside end of the torsion springs each have a small slot 36 which are engaged by the projections 37 and 38 on the shaft 31. (FIG. 4). The other end of each spring is connected in a slot 39 in the side extensions 41 of the pinion 40. The pinion is fixed to the bushings and rotates therewith about the shaft 31.

The spring force urges the pinion and bushing counter-clockwise with respect to the shaft when the spring is in a tensioned condition.

The drive means may include teeth means on the webbing and gear means on the drive means. The gear means engages the teeth means to ensure positive drive between the webbing and the drive means. The teeth means may include a row of teeth on a strip, and the strip is attached to one side of the webbing. In the exemplary embodiment, the gear means includes gear teeth 43 on the pinion. (FIGS. 2 and 3). The webbing teeth means include webbing teeth 44 which are mounted on strip 45 which is sewn by stitches 46 to the webbing.

Stop means are associated with the strip for limiting the length of webbing which can pass through the releasable anchor. In the exemplary embodiment, such stop means 47 and 48 are attached to the webbing at the ends of the webbing teeth means. The stop means are of such a size that they will not pass between the pinion and the bushing cover 28 of the main frame 23. Therefore, when the webbing travels through the releasable anchor or connector, it is limited to travel between the two stop means.

In operation, the invention functions in the following manner. Normally, when there is no occupant in the vehicle, the restraint system would be in a stowed position. In that position, the webbing would essentially hang betwen the fitting 7 and the anchor 4. Any tension in springs 34 and 35 would cause the connector or releasable anchor 20 is in its lowermost position, and stop means 48 would be against the main frame 23. The position of stop means 48 sets the stowed position of the connector. When the seat belt is desired to be used, the occupant would pull on the connector 20 to pull the webbing away from its stowed position. As the webbing is pulled from the retractor 5, the connector 20 would be pulled across the lap belt portion 9 of the webbing in order for connector 20 to reach buckle 11. In so doing, pinion 40 and bushings 32 and 33 are rotated in a clockwise direction (FIG. 4) as the webbing passes through the connector and the webbing teeth 44 contact the gear teeth 42. The clockwise rotation tensions springs 34 and 35.

When the connector 20 is inserted into the buckle 11, the stored energy in the spring causes the lap belt portion 9 to tighten to its correct position. Thereafter, even if tension from the retractor 5 is relieved, which would occur if retractor 5 is a tensionless retractor or if a clip is attached to the webbing to prevent it from being fully retracted, the tension supplied to the lap belt portion 9 by the springs of the connector 20 causes the lap belt portion to remain tight and correctly located on the user.

During a crash, the usual loading on the webbing will produce friction to maintain the webbing in the pre-crash orientation, that is with the lap belt tight against the pelvis. Any minor slipping of little importance and the friction from the loading prevents slipping of any consequence.

It should be understood by those skilled in the art that the within disclosure is of an exemplary embodiment of the present invention only and that various modifications could be made within the scope of the invention which is defined by the following claims.

I claim:

1. In a continuous loop restraint system for restraining a person in a vehicle seat including a generally stationary anchor for anchoring one end of a length of webbing to the vehicle, a releasable anchor for releasably anchoring a central portion of the webbing, and a retractor on the vehicle for winding the other end of the webbing therearound so that the portion of the webbing on one side of the releasable anchor is adapted to restrain the pelvis of the person and so that the portion of the webbing on the other side of the releasable anchor is adapted to restrain the upper part of the torso of the person, and wherein said webbing can slide relative to said releasable anchor to allow respective webbing sections to be of a desired length, the improvement comprising the provision of:

drive means adjacent said releasable anchor for urging said webbing through said releasable anchor toward said retractor so that excess webbing is wound about said retractor and so that the portion of webbing between the stationary anchor and the releasable achor is tightened.

2. The improvement of claim 1 wherein said drive means comprises:

spring loaded means, wound to a tensioned condition when the releasable anchor means is moved from a stowed position to its anchored position, for urging said webbing toward said retractor.

3. The improvement of claim 1 wherein said drive means further comprises:

webbing teeth means on said webbing, and gear means on the drive means, said gear means engaging said webbing teeth means to ensure positive drive between the webbing and the drive means.

4. The improvement of claim 3, wherein said webbing teeth means further comprises:

a row of teeth on a strip, said strip being attached to one side of said webbing.

5. The improvement of claim 4, wherein said drive means comprises:

stop means associated with said strip for limiting the length of webbing which can pass through said releasable anchor.

6. In a connector for a continuous loop restraint system for a vehicle, said connector having means for attaching said connector to a buckle attached to the vehicle, webbing of the restraint system passing through the connector whereby the length of webbing on either side of the connector is adjustable, the improvement comprising the provision of:

said connector including drive means on the connector for driving the webbing through said connector to tighten the webbing on the side of the connector from which the webbing is pulled.

7. The improvement of claim 6, wherein said drive means comprises:

spring means associated with said drive means for driving said drive means, said spring means being wound when said connector is pulled from a stowed position to its position attached to said buckle whereby when said connector is attached to said buckle, the spring means releases the stored energy by unwinding the spring means so that the drive means drives said belt.

8. The improvement of claim 7, wherein said drive means comprises:

webbing teeth means on said webbing and gear means on the drive means, said gear means engaging said webbing teeth means to ensure positive drive between the webbing and the drive means.

9. In a system for insuring that the lap belt portion of a continuous loop restraint system is tight about a person's pelvis, including:

a length of webbing attached at the floor of the vehicle to a permanent anchor and attached to the upper portion of the vehicle at a retractor, said retractor winding webbing thereon;

a connector on said webbing allowing movement of said webbing therethrough;

a buckle attached to the floor of the vehicle, said connector having means for releasable attachment to said buckle such that when the connector is attached to the buckle, the portion of the webbing between the connector and the permanent anchor fits about the user's pelvis and the portion of the webbing between the connector and the retractor extends over the front of the user, and when the connector is not attached to the buckle, the excess webbing is wound about the retractor so that the webbing extends directly from the permanent anchor to the retractor, the improvement comprising:

stop means on the webbing for limiting the travel of the connector along said webbing to position the connector when it is in its stowed position.

* * * * *